(12) United States Patent
Rajarao et al.

(10) Patent No.: US 8,751,870 B2
(45) Date of Patent: Jun. 10, 2014

(54) METHOD AND SYSTEM FOR PROVIDING A RANDOM SEQUENCE COVERAGE

(75) Inventors: Ravishankar Rajarao, Bangalore (IN); Chinthana Ednad, Bangalore (IN); Deepthi Gopalakrishna Kavalur, Bangalore (IN)

(73) Assignee: Whizchip Design Technologies Pvt. Ltd., Bangalore, Karnataka (IN)

( * ) Notice: Subject to any disclaimer, the term of this patent is extended or adjusted under 35 U.S.C. 154(b) by 281 days.

(21) Appl. No.: 13/231,945

(22) Filed: Sep. 13, 2011

(65) Prior Publication Data

US 2013/0067280 A1    Mar. 14, 2013

(51) Int. Cl.
*G06F 11/00*    (2006.01)

(52) U.S. Cl.
USPC ................................. 714/32; 714/33; 717/126

(58) Field of Classification Search
USPC ....................................... 714/32, 33; 717/126
See application file for complete search history.

(56) References Cited

U.S. PATENT DOCUMENTS

| | | | |
|---|---|---|---|
| 5,608,783 A * | 3/1997 | Ichnowski et al. | 379/88.18 |
| 6,430,741 B1 * | 8/2002 | Mattson et al. | 717/154 |
| 7,188,273 B2 * | 3/2007 | Allen et al. | 714/6.3 |
| 8,381,194 B2 * | 2/2013 | Wang | 717/131 |
| 2009/0125595 A1 * | 5/2009 | Maes | 709/206 |
| 2010/0275062 A1 * | 10/2010 | Ur | 714/32 |
| 2010/0304717 A1 * | 12/2010 | Bhatt et al. | 455/412.1 |
| 2011/0035631 A1 * | 2/2011 | Bhinge | 714/48 |

\* cited by examiner

*Primary Examiner* — Charles Ehne
(74) *Attorney, Agent, or Firm* — Barry Choobin; Patent360 LLC

(57) ABSTRACT

The various embodiments of the present invention provide a method and system for providing random sequence coverage. The method comprising receiving a plurality of data packet packets carrying transaction data from a transaction database, specifying transactions in a configuration file along with the transaction data, identifying one or more fields in the packets received from the transaction database, generating an automatic random sequence based on the identification of at least one of a field among the one or more fields in the data packets, generating a coverage report for the random sequence generated automatically and determining uncovered sequences based on the coverage report generated. The system comprises a transaction database for storing transaction data during simulation, a transaction viewer for providing transactions data packets, an auto sequence generator module for generating an automatic random sequence and a report generator module for generating a coverage report for the random sequence generated.

15 Claims, 5 Drawing Sheets

METHOD AND SYSTEM FOR PROVIDING A RANDOM SEQUENCE COVERAGE

CROSS-REFERENCE TO RELATED APPLICATIONS

The present application claims priority to the foreign application having serial number 906/CHE/2011 filed on Mar. 24, 2011, and that application is incorporated in its entirety at least by reference.

BACKGROUND

1. Technical Field

The embodiments herein generally relate to sequence generation. The embodiments herein particularly relate to automated random sequence generation. The embodiments herein more particularly relates to a method for generating a coverage report for the automated random sequence generated.

2. Description of the Related Art

Generally during regression testing, verification challenges grow exponentially with design complexity. The designers need to adopt new tools and methodologies to deliver on stringent time to production requirements. The main aim of any verification tool is to provide a complete coverage summary in a short span of time and also by occupying lesser memory with least user interaction. The coverage tools provide objective measures of which design features have been exercised by the test suite. Further from the design specification the verification test suite has to be created with a detailed list of what to test and how. It is a real challenge to provide genuine random sequence coverage with less time, least memory utilization and without human intervention.

Further in the existing techniques, for a typical ASIC/hardware development/testing scenario, the debug and performance analysis is done at the wave form levels which are essentially outputted as debug statements or utilities available with the simulation engine. Although this technique is helpful from the functional or timing operation of the device, conformance with respect to a given protocol requires higher level of abstraction to analyze the waveforms.

Also, the scenario would become extremely complex to analyze when multiple devices are involved. Further it is very important to ensure accurate working of the device being developed conforms to a given standard without breaching the integrity of the actual data payload. Essentially, analysis of such implementation at the wave form level does not add-up and therefore the need for bus watchers at the packet or PDU levels gains significance.

Hence there is a need for a method and system for automatically generating sequences for random sequence generation coverage. There also exists a need to provide a method and system for providing a coverage report on the sequence generation. Further there is also a need for a method and system for automatically generating sequences with no user intervention and minimal information about the sequences.

The abovementioned shortcomings, disadvantages and problems are addressed herein and which will be understood by reading and studying the following specification.

SUMMARY

The primary object of the embodiments herein is to provide a method and system for providing random sequence coverage by automatically generating sequences.

Another object of the embodiments herein is to provide a method and system for automatically generating sequences and parallel providing a coverage report.

Another object of the embodiments herein is to provide a method and system for automatically generating sequences with no additional memory usage.

Another object of the embodiments herein is to provide a method and system for automatically generating sequences with no human intervention Yet another object of the embodiments herein is to provide a method and system for automatically generating sequences with no affect on simulation time.

Yet another object of the embodiments herein is to provide a method and system for automatically generating sequences by providing only minimal information about the sequences to be generated.

According to an embodiment of the present disclosure, the method of generating the automatic random sequence comprising steps of retrieving each of the transaction data by separation of values in one or more fields of a coverage tracker configuration file, mapping the transaction data with a simformat section of the configuration file, obtaining a simlog data based on mapping of the transaction data, providing a user defined configuration file to the autosequence generation module, generate a first set of sequences, disabling detailed sequence track to perform a coverage summary track, analyzing the values obtained from the transaction database and obtaining the missed sequences.

According to an embodiment of the present disclosure, generating the coverage report comprising steps of providing a user defined configuration file to the autosequence generation module, optimizing a coverage tracker data structure by removing the sequences not present in a coverage summary track of the first set of sequences and enabling detailed tracking of sequences and log values to generate a report.

According to an embodiment of the present disclosure, disabling detailed sequence track comprising steps of checking for uncovered sequences in the automatic random sequence generated, providing zero hit sequences on a first part of the coverage report and providing the hit sequences on a second part of the coverage report.

According to an embodiment of the present disclosure, at least one of the uncovered and covered sequences in the report is determined using a computing algorithm.

According to an embodiment of the present disclosure, tracking of the automated random sequences and log values provides for generating the coverage report.

Embodiments herein further provide a system for automatically generating a random sequence. The system comprising a transaction database for storing transaction data during simulation, a transaction viewer for providing transaction data packets, an auto sequence generator module for generating an automatic random sequence based on the transaction data in the configuration file and a report generator module for generating a coverage report for the random sequence generated automatically.

According to an embodiment of the present disclosure, the auto sequence generator module comprises a coverage tracker module for loading and parsing a user written configuration file and an auto sequence generator core for generating the automatic random sequences.

According to an embodiment of the present disclosure, the coverage tracker module comprises a coverage tracker core for performing at least one of a summary tracking of the coverage and a detailed tracking of the coverage, a coverage tracker parser for loading the user written configuration file to the autosequence generator core.

According to an embodiment of the present disclosure, the auto sequence generator module identifies at least one of a field among the one or more fields in the transaction data packets to generate random sequences.

These and other objects and advantages of the present invention will become readily apparent from the following detailed description taken in conjunction with the accompanying drawings.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the present invention are shown in some drawings and not in others. This is done for convenience only as each feature may be combined with any or all of the other features in accordance with the present invention.

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein are to provide a method and system for providing random sequence coverage. The method includes receiving a plurality of packets about a transaction data from a transaction database. The method further includes specifying transactions in a configuration file along with the transaction data. The method includes identifying one or more fields in the packets received from the transaction database and generating an automatic random sequence based on the identification of at least one of a field among the one or more fields in the packets. The method also includes generating a coverage report for the random sequence generated automatically and determining uncovered sequences based on the coverage report generated.

Embodiments herein further disclose a system for providing random sequence coverage. The system includes a transaction viewer for specifying transactions in a configuration file along with the transaction data. Further the system includes a transaction database for storing the transaction data during simulation and a superset of coverage tracker. The system includes an auto sequence generator module for generating an automatic random sequence based on the identification of at least one of a field among the one or more fields in the packets. The system also includes a report generator module for generating a coverage report for the random sequence generated automatically.

The transactions are specified by a user during post process simulation stage. The transactions are also specified by a user based on the post processing simulation history.

The coverage report is generated by checking for covered and uncovered sequences in the automatic random sequence generated. The coverage report generated is tracked by a coverage tracking module. Further the coverage report generated provides a complete coverage summary of the random sequence generation occupying minimal memory and with least user interaction.

Figure 1:
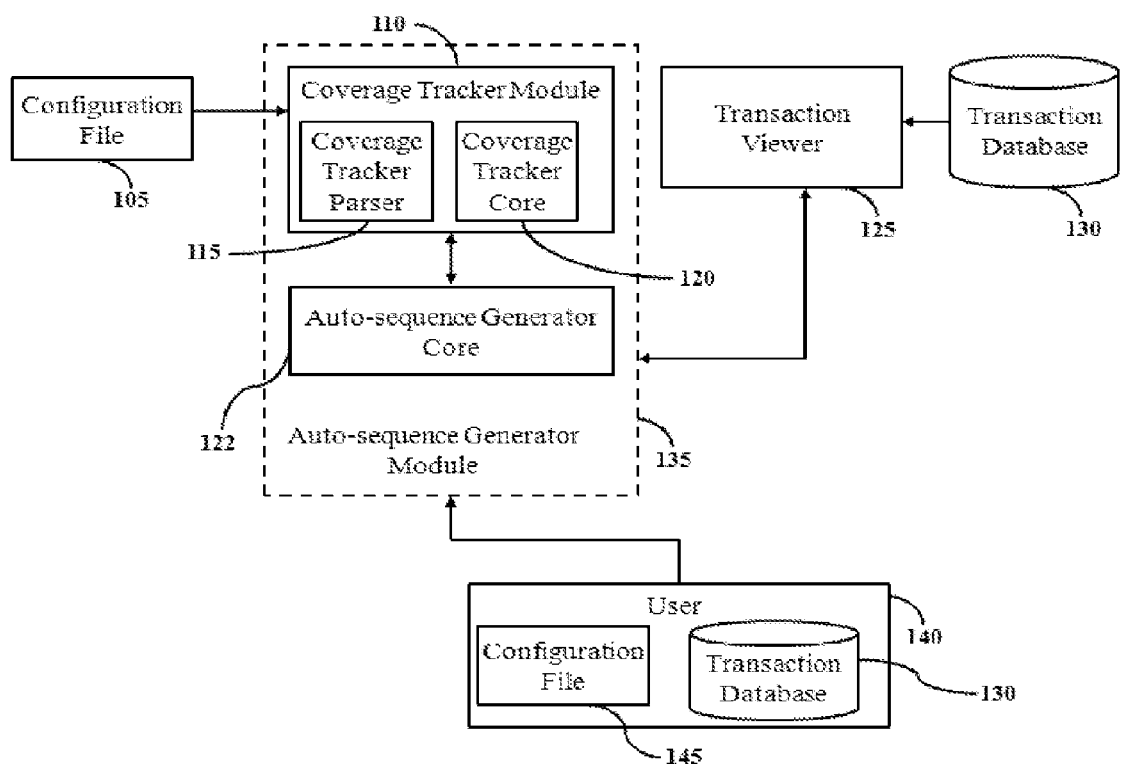
FIG. 1 is an architectural diagram of an autosequence generation module, according to one embodiment of the present disclosure.

FIG. 1 is an architectural diagram of an autosequence generation module, according to one embodiment of the present disclosure. The diagram includes a configuration file (CFG) 105, a transaction viewer 125, a transaction database 130, and an auto sequence generator module 135. The auto sequence generator module 135 includes a coverage tracker module 110 and an auto sequence generator core 122. The configuration file 105 contains the key information to generate auto sequences. The CFG file 105 includes an autoseqn section containing information such as base name of the autosequence to be generated, count sequence length and list of transactions. The CFG file 105 includes minimal information about the transaction performed such as information relating to fields such as names of the fields that makes the header, payload and footer.

The coverage tracker module 110 includes a coverage tracker parser 115 and a coverage tracker core 120. The coverage tracker core 122 in the coverage tracker module 110 performs two types of coverage tracking. The first type, the coverage tracker module 110 performs a summary coverage tracking performed to obtain a list of 0% covered sequences. Further in the second type, the coverage tracker module 110 performs a detailed tracking of coverage to provide complete coverage information.

The coverage tracker module 110 is responsible for loading and parsing the user written CFG file. The coverage tracker module 110 also processes the read information for generating all possible sequences of specified length. The coverage tracker module 110 is also responsible for handling the data structure created in an optimal way to utilize less memory.

The transaction viewer 125 receives the transactions details from the transaction database 130 and provides utilities to support the analysis of transaction done at packet/PDU levels. The transaction viewer 125 APIs log all the trace transaction and signal details in relevant files register as part of API init calls. The CFG file is the configuration file 105 where the coverage goals and the variable relationships are specified through a configuration file 105.

The auto sequence generator module 135 identifies one or more fields in the packets received from the transaction viewer 125. The auto sequence generator module 135 then generates an automatic random sequence based on the identification of at least one of a field among the one or more fields in the packets. The auto sequence generator module 135 also generates a coverage report for the uncovered sequences without consuming extra time and memory, user inputs and simulation time.

The auto sequence generator module 135 receives the inputs from user for processing. The user 150 provides information to the auto sequence generator module 135 though the transaction database 130 and the CFG file 105. The information is embedded in the auto sequence section of the CFG file 105. The inputs includes the configuration file 105 containing the AUTO_SEQ' section and the transaction database 130 containing a superset of coverage tracker. The configuration file 105 includes the information related to auto sequences generation.

Figure 2:
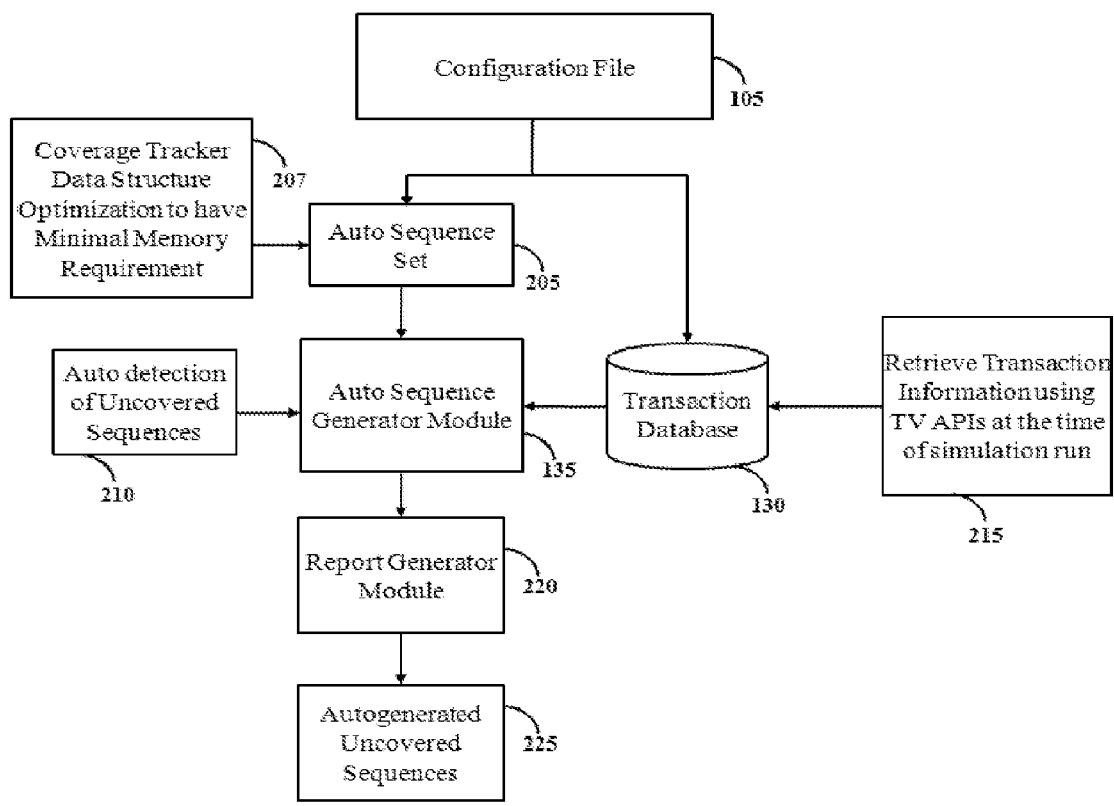
FIG. 2 is a block diagram illustrating a system for automatically generating uncovered sequences using an automatic generator module, according to one embodiment of the present disclosure.

FIG. 2 is a block diagram illustrating a system for automatically generating uncovered sequences using an automatic generator module, according to one embodiment of the present disclosure. The system includes the configuration file (CFG) 105, the coverage tracker module 110, the transaction viewer 125, the transaction database 130, and the auto sequence generator module 135.

The auto sequence generator module 135 includes a report generator module 220 for generating a coverage report for the random sequence generated automatically. The auto sequence generator module 135 receives the inputs from user for processing. The inputs includes the configuration file 105 containing the AUTO_SEQ' (autosequence) section and the transaction database 130 containing a superset of coverage tracker. The configuration file 105 includes the information and required for generation of auto sequences. The AUTO_SEQ section contains information such as a base name for the auto sequence set 205 to be generated, the sequence length count and data regarding a list of transactions. The uncovered sequences are detected automatically 210 by the auto sequence generator module 135. Further the automatically generated uncovered sequences 225 are determined based on the coverage report generated.

The transaction viewer 125 accepts an input from the transaction database 130. The transaction viewer 125 reads the transaction database 130 and provides information about the recorded transactions. The data is read sequentially starting from first transaction to the end of simulation. Further data from each transaction is extracted and passed to the auto sequence generator module 135 for coverage tracking. Further a plurality of Application Programming Interfaces (APIs) 215 retrieves the transaction information from a transaction viewer 125 and provides the transaction information to the auto sequence generator module 135. The following APIs are used to retrieve transaction information from TV database to AutoSeqGen module:
$Core_db_Core_open( )
$Core_db_Core_read( )
$Core_db_close( )

Figure 3:
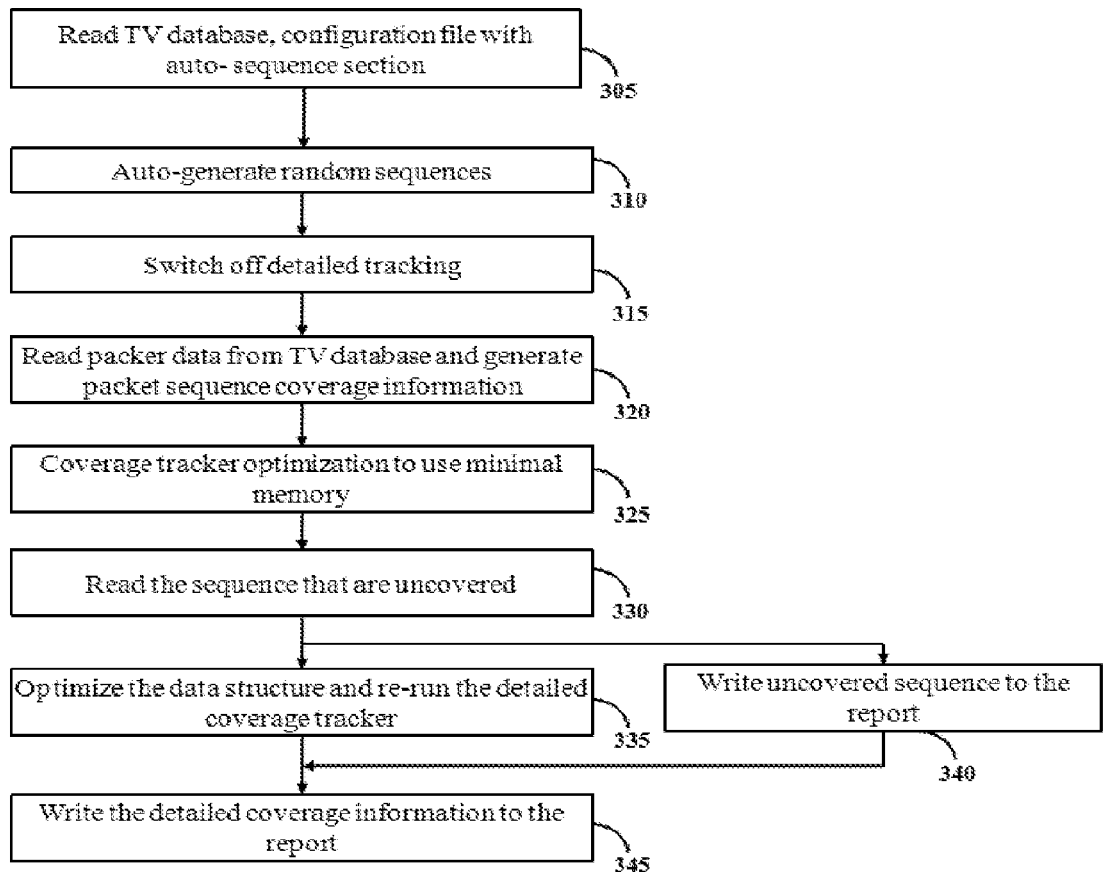
FIG. 3 is a flow chart illustrating a method for automatically generating a random sequence, according to one embodiment of the present disclosure.

FIG. 3 is a flow chart illustrating a method for automatically generating a random sequence, according to one embodiment of the present disclosure. The auto sequence generator module is an intermediate module capable of interacting with the transaction database and coverage tracker module for post processing. The auto sequence generator module is also responsible for calling coverage tracker core and TV APIs, providing the transaction data and further generating a report of the random sequence coverage.

The method comprises providing (305) a configuration file containing the AUTO_SEQ' section and the transaction data from a transaction database containing a superset of coverage tracker into the auto sequence generator module. The sequences are generated automatically (310) based on the information provided through the configuration file. The detailed sequence tracking is then disabled to perform quick summary track coverage (315). Further values obtained from the transaction database are logged into the auto sequence generator module and the uncovered sequences are stored.

The CFG file is reloaded (320) to the auto sequence generator module and the coverage tracker data structure is optimized by removing the sequences which are not present in the previous coverage track (325). The uncovered sequences determined are then provided (330) into the auto sequence generator module. A shutdown function of coverage tracker module is called which in turn clears and reallocates the memory and maintains only the list of 0% hit sequences for further processing. The memory is reallocated by a large extent and such that the memory leaves enough space for subsequent processing also. The data structure is optimized and re-run of the detailed coverage tracker is performed (335). Further detailed tracking of sequence and log values are enabled to get a detailed report. The report generated includes 0% hit sequence or the uncovered sequences (340) in the first part followed by detailed coverage information (345) including the covered sequences in the second part.

Figure 4:
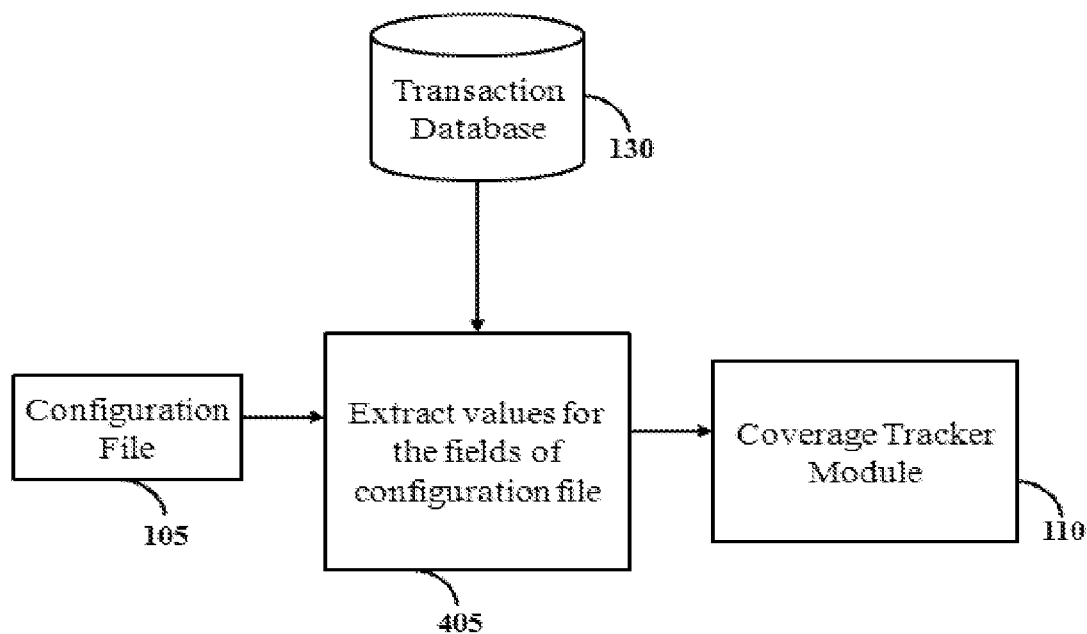
FIG. 4 is a flow diagram illustrating the logging of the transaction data from the database to the coverage tracker, according to one embodiment of the present disclosure.

FIG. 4 is a flow diagram illustrating the logging of the transaction data from the database to the coverage tracker, according to one embodiment of the present disclosure. The data base is a TV database which acts as a source of simlog. The auto sequence generator module 135 extracts 405 each of the transaction information from the transaction database 130 and filters the values only for the fields of Coverage Tracker CFG file. The filtered data is mapped with simformat section of the configuration file 105 and rearranged to obtain the simlog in the required format. The log_sims API receives the simlog as a parameter. These values are read into the coverage tracker module 110.

Figure 5:
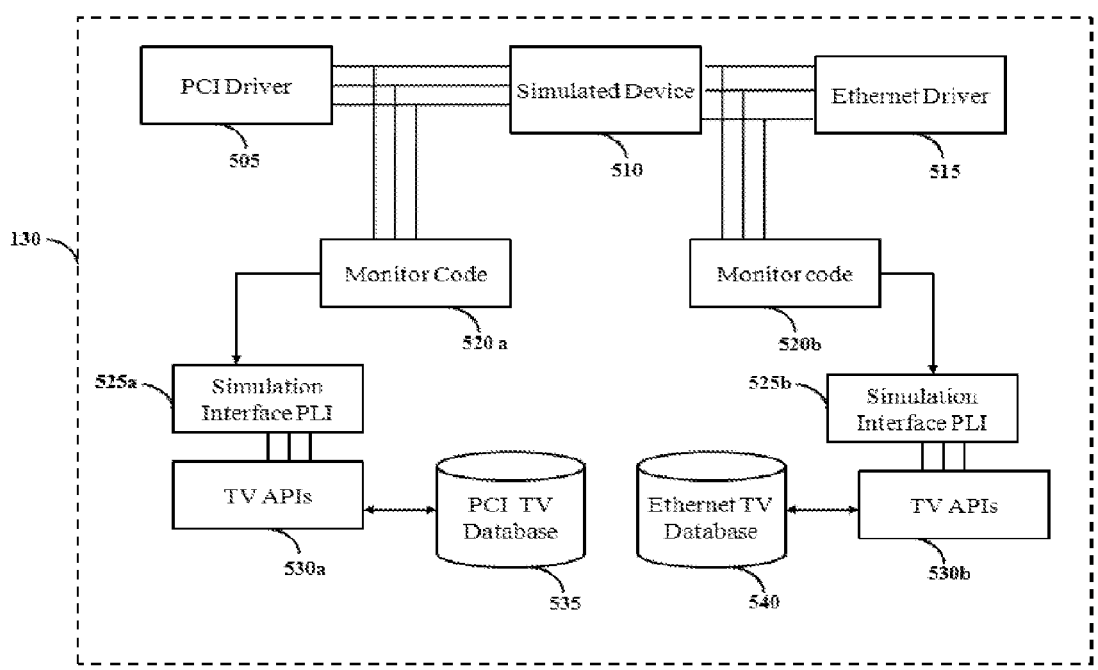
FIG. 5 is an exemplary diagram illustrating the functioning of a transaction database in detail to obtain transaction values, according to one embodiment of the present disclosure.

FIG. 5 is an exemplary diagram illustrating the functioning of a transaction database in detail to obtain transaction values, according to one embodiment of the present disclosure. With respect to FIG. 5, the transaction database 130 includes a PCI driver 505, a simulated device 510, an Ethernet driver 515, one or more monitor codes 520a and 520b, one or more simulation interface PLI 525a and 525b, one or more TV APIs 530a and 530b, a PCI TV database 535 and an Ethernet TV database 540.

The transaction database 130 is an archive that records the complete simulation data. Further a monitor code observes the transactions happening on soft wires. The characteristics of transactions are extracted and recorded in the transaction database 130 using a list of the TV APIs 530a. The TV APIs 530a log all the trace transaction and signal details in relevant files register as part of API init calls.

The listed below are few of TV APIs 530a that are used for recording the transaction details:
  Core_tv_load_cfgfile
  Core_tv_log_header_simlog
  Core_tv_log_payload_simlog
  Core_tv_log_footer_simlog
  Core_tv_error_pkt_detail
  Core_tv_log_time.

The random sequence coverage according to the embodiments herein provide for a random functional coverage in real time. The auto sequence generator module automatically generates sequences and parallely generates a coverage report without utilizing extra memory. Further the generation of sequences and report is performed post processing which in turn does not affect the simulation time. Also it requires minimal information about the sequences for sequence generation.

Although the specific features of the present invention are shown in some drawings and not in others. This is done for convenience only as each feature may be combined with any or all of the other features in accordance with the present invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A method for providing a random sequence coverage, the method comprising steps of:
   receiving a plurality of data packets carrying transaction data from a transaction database;
   specifying transactions in a configuration file along with the transaction data;
   identifying one or more fields in the packets received from the transaction database;
   generating an automatic random sequence based on the identification of at least one of a field among the one or more fields in the data packets;
   generating a coverage report for the random sequence generated automatically, and wherein generating the coverage report comprises providing a user defined configuration file to the auto sequence generation module to generate a first set of sequences, disabling detailed sequence track to perform a coverage summary track, analyzing values obtained from the transaction database and obtaining the missed sequences; and
   determining uncovered sequences based on the coverage report generated.

2. The method according to claim 1, wherein the transaction data is specified by a user during a post process simulation stage.

3. The method according to claim 1, wherein the transaction data is based on the post processing simulation history.

4. The method according to claim 1, wherein the configuration file and the transaction data provides for generating a plurality of automated random sequences.

5. The method according to claim 1, wherein the configuration file comprises an autoseq section including at least one of:
   a base name to generate an auto sequence;
   a sequence length count; and
   a list of transactions.

6. The method according to claim 1, wherein the configuration file comprises one or more coverage goals and variable transaction relationships.

7. The method according to claim 1, wherein the generating of the automatic random sequence comprising steps of:
   retrieving each of the transaction data by separation of values in one or more fields of a coverage tracker configuration file;
   mapping the transaction data with a simformat section of the configuration file; and obtaining a simlog data based on mapping of the transaction data.

8. The method according to claim 1, wherein generating the coverage report comprises further comprising steps of:
   providing a user defined configuration file to the autosequence generation module;
   optimizing a coverage tracker data structure by removing the sequences not present in a coverage summary track of the first set of sequences; and
   enabling detailed tracking of sequences and log values to generate a report.

9. The method according to claim 1, wherein disabling detailed sequence track comprises steps of:
   checking for uncovered sequences in the automatic random sequence generated;
   providing zero hit sequences on a first part of the coverage report; and
   providing the hit sequences on a second part of the coverage report.

10. The method according to claim 1, wherein at least one of the uncovered and covered sequences in the report are determined using a computing algorithm.

11. The method according to claim 1, wherein the tracking of the automated random sequences and log values provides for generating the coverage report.

12. The method according to claim 1, wherein the transaction data is extracted and passed to an auto sequence generator module for coverage tracking.

13. A system for automatically generating a random sequence, the system comprising:
   a transaction database for storing transaction data during simulation;
   a transaction viewer for providing transaction data packets;
   an auto sequence generator module for generating an automatic random sequence based on the transaction data in the configuration file, and wherein the auto sequence generator module comprises a coverage tracker module and an auto sequence generator core, and wherein the coverage tracker module comprises a coverage tracker core and a coverage tracker parser, and wherein the coverage tracker module is configured to load and parse an user written configuration file, and wherein the auto sequence generator core is configured to generate the automatic random sequences, and wherein the coverage tracker core is configured to perform at least one of a summary tracking of the coverage and a detailed tracking of the coverage, and wherein the coverage tracker parser is configured to load the user written configuration file to the autosequence generator core;
   and
   a report generator module for generating a coverage report for the random sequence generated automatically.

14. The system according to claim 13, wherein the auto sequence generator module identifies at least one of a field among the one or more fields in the transaction data packets to generate random sequences.

15. The system according to claim 13, wherein the transaction data packets includes at least one of a transaction data and the configuration file.

\* \* \* \* \*